United States Patent
Nakamura et al.

(10) Patent No.: US 12,220,289 B2
(45) Date of Patent: Feb. 11, 2025

(54) DENTAL FLOSS, CONTINUOUS DENTAL FLOSS, AND METHOD FOR MANUFACTURING CONTINUOUS DENTAL FLOSS

(71) Applicant: GC CORPORATION, Shizuoka (JP)

(72) Inventors: Masaru Nakamura, Tokyo (JP);
Kumiko Yokonuma, Tokyo (JP);
Youko Suda, Tokyo (JP); Aki Sato, Tokyo (JP)

(73) Assignee: GC CORPORATION, Shizuoka (JP)

( * ) Notice: Subject to any disclaimer, the term of this patent is extended or adjusted under 35 U.S.C. 154(b) by 466 days.

(21) Appl. No.: 17/470,137

(22) Filed: Sep. 9, 2021

(65) Prior Publication Data

US 2022/0079725 A1    Mar. 17, 2022

(30) Foreign Application Priority Data

Sep. 11, 2020  (JP) .................................. 2020-153137

(51) Int. Cl.
*A61C 15/04*   (2006.01)

(52) U.S. Cl.
CPC .................................. *A61C 15/042* (2013.01)

(58) Field of Classification Search
CPC ........................... A61C 15/041; A61C 15/042
See application file for complete search history.

(56) References Cited

U.S. PATENT DOCUMENTS

| | | | |
|---|---|---|---|
| 8,132,579 B1 * | 3/2012 | Wien | A61C 15/042 |
| | | | 132/321 |
| 2003/0172951 A1 | 9/2003 | Baillie et al. | |
| 2005/0279377 A1 * | 12/2005 | Sarjeant | A61C 15/041 |
| | | | 132/321 |
| 2012/0160951 A1 | 6/2012 | Kalbfeld et al. | |
| 2016/0242882 A1 | 8/2016 | Stuart | |

FOREIGN PATENT DOCUMENTS

| | | |
|---|---|---|
| CA | 2 450 178 C | 5/2007 |
| JP | 08-117252 A | 5/1996 |
| JP | 2003-508111 A | 3/2003 |
| JP | 5221280 B2 | 6/2013 |
| JP | 2017-123920 A | 7/2017 |

* cited by examiner

*Primary Examiner* — Rachel R Steitz
(74) *Attorney, Agent, or Firm* — Sughrue Mion, PLLC

(57) ABSTRACT

Provided is a dental floss that keeps cleaning performance thereof on one hand, and that is easy to handle because of a high rigid portion thereof on the other hand. Dental floss includes: a floss part that is formed by twisting a plurality of filaments together but not tying up the filaments; and tied-up parts that are provided continuously with the floss part, and are formed by tying up the plurality of the filaments, wherein each of the tied-up parts is formed in such a manner that filaments are covered with a contour part in a cross section thereof.

8 Claims, 12 Drawing Sheets

DENTAL FLOSS, CONTINUOUS DENTAL FLOSS, AND METHOD FOR MANUFACTURING CONTINUOUS DENTAL FLOSS

FIELD

The present invention relates to dental floss (interdental cleaning tool).

BACKGROUND

Dental floss is known as one means for cleaning spaces between teeth (interdental spaces). As described in Patent Literatures 1 and 2, dental floss is constituted of a plurality of thin filamentous fibers (filaments) tied up to form a piece of yarn. These plural tied-up filaments pass through an interdental space so that interdental stains are entangled in the filaments, which results in interdental cleaning.

CITATION LIST

Patent Literature

Patent Literature 1: JP 5221280 B2
Patent Literature 2: JP H8-117252 A

SUMMARY

Technical Problem

According to the invention disclosed in Patent Literature 1, sheath yarn is spirally wound around core yarn, which can increase rigidity on one hand, but which generates, on the other hand, portions held by the sheath yarn in the core yarn to degrade cleaning performance. The structure according to the invention disclosed in Patent Literature 1 is complicated, which leads to production thereof accompanied by a lot of work, which is also problematic.

The invention disclosed in Patent Literature 2 provides tied-up portions at predetermined intervals. These tied-up portions are believed to have higher rigidity than the other portions. However, it cannot be said that sufficient rigidity can be obtained.

With the foregoing problems in view, an object of the present invention is to provide a dental floss that keeps cleaning performance thereof on one hand, and that is easy to handle because of a high rigid portion thereof on the other hand.

Solution to Problem

One aspect of the present disclosure is a dental floss comprising: a floss part that is formed by twisting a plurality of filaments together but not tying up the filaments; and tied-up parts that are provided continuously with the floss part, and are formed by tying up the plurality of the filaments, wherein each of the tied-up parts is formed in such a manner that filaments are covered with a contour part in a cross section thereof.

Another aspect of the present disclosure is continuous dental floss that is formed by alternately disposing a plurality of the floss parts and tied-up parts.

Another aspect of the present disclosure is a method for manufacturing continuous dental floss that is constituted of continuous pieces of dental floss, the method comprising: alternately forming a part to be heated and a part not to be heated on raw yarn, the raw yarn being formed by twisting a plurality of filaments together, wherein in said forming the part to be heated, the raw yarn is heated without pressing force applied thereto, so that an outer circumferential portion of the raw yarn is melted and welded.

Advantageous Effects of Invention

The present invention can provide a dental floss that keeps cleaning performance thereof on one hand, and that is easy to handle because of a high rigid portion thereof on the other hand.

BRIEF DESCRIPTION OF DRAWINGS

FIG. 3 is an explanatory view of an example of a filament 10a.

DETAILED DESCRIPTION OF EMBODIMENTS

1. Dental Floss

Figure 1:
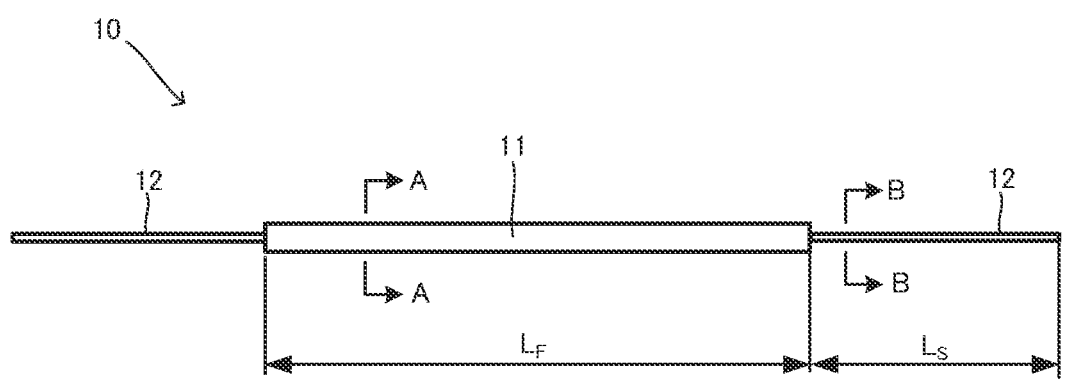
FIG. 1 is an external view of dental floss 10.

FIG. 1 is an external view of dental floss 10 according to one embodiment. As can be seen from FIG. 1, the dental floss 10 is a stringlike member as a whole, and has a floss pan 11 that is thickly formed and contributes to interdental cleaning mainly, and tied-up parts 12 that are portions tied up to be thin.

The dental floss 10 according to the present embodiment represents a piece of dental floss for one usage. The tied-up parts 12 continuously extend from both respective ends of the floss part 11.

A detailed description is as follows.

1.1. Floss Part

Figure 2:
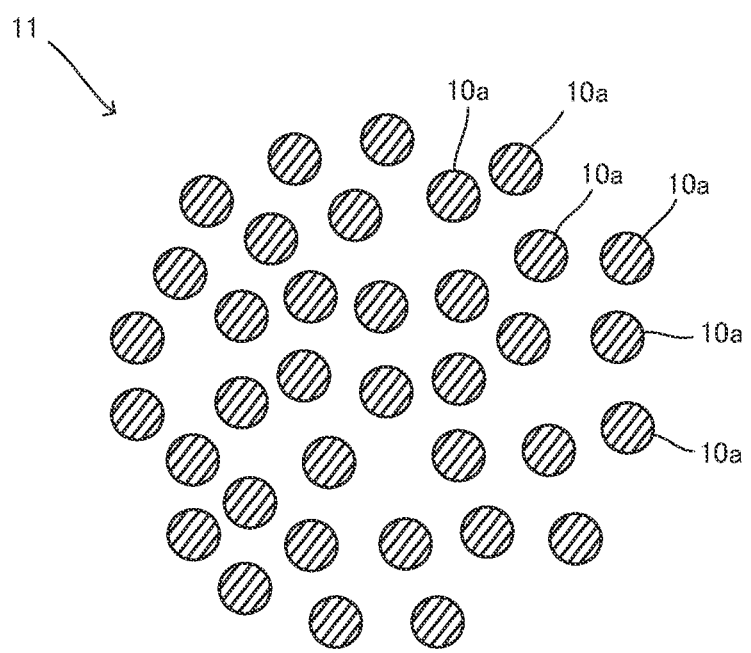
FIG. 2 is an explanatory view of a floss part 11.
Figure 12:
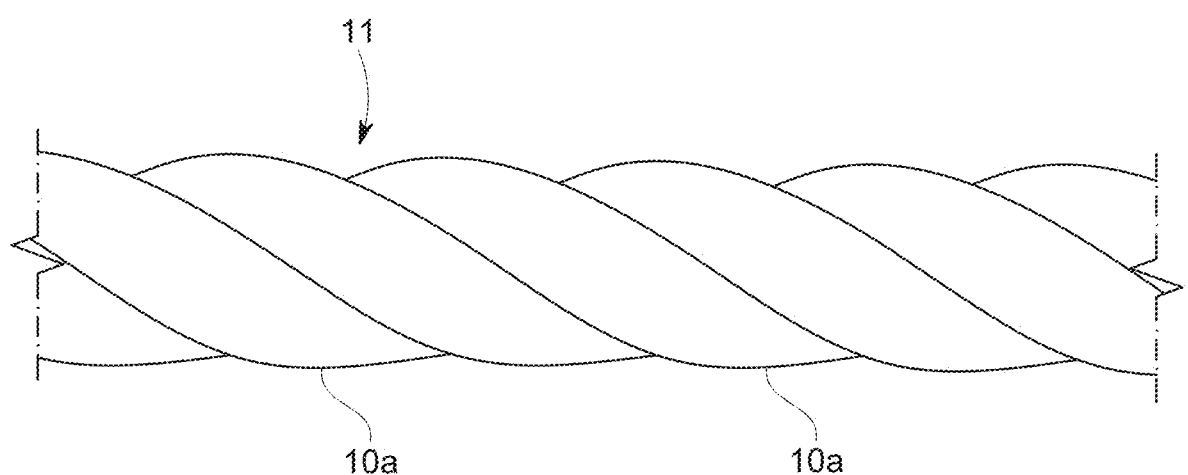
FIG. 12 is an explanatory view of a floss part 11.

The floss part 11 is a portion that has a function so as to be disposed between teeth to entangle stains therein. The floss part 11 has a filamentous shape and is constituted of a plurality of filaments 10 a that are thin fibers, twisted together. FIG. 2 schematically shows a cross section along the arrows A-A in FIG. 1 (i.e., a cross section orthogonal to a direction where the floss part 11 and the filaments 10 a extend). FIG. 12 shows a view of the plurality of filaments 10a. As can be seen from FIG. 2 and FIG. 12, in the floss part 11, a plurality of the filaments 10 a are twisted together but are not joined to each other. In the cross section shown in FIG. 2 (in a lateral cross section), each individual filament 10 a is configured so as to be movable within a predetermined range.

This makes it possible to entangle interdental stains in each individual filament 10a, and to hold entangled interdental stains in spaces among adjacent filaments 10a.

The floss part 11 has a length $L_F$ that is not particularly limited. The length $L_F$ of approximately 50 mm to 200 mm leads to dental floss easy to use.

The number of the filaments 10a constituting the floss part 11 is not particularly limited, but is preferably approximately 1000 to 3000. The number less than 1000 may lead to difficulty in saying that the cleaning function of the floss part 11 is sufficient. The number more than 3000 leads to difficulty in moving the floss part 11 between teeth.

The thickness of the floss part varies depending on the number of the filaments 10a constituting the floss part 11. The thickness of the floss part 11 is within a certain range but is not fixed since there is much play in the filaments 10a of the floss part 11 as shown in FIG. 2. In the dental floss 10 according to this embodiment, there is no elements to hold the filaments 10a down in the floss part 11. Thus, the dental floss 10 has high cleaning performance.

The filaments 10a constituting the floss part 11 are not particularly limited, and examples thereof may be resins such as polyester, nylon, polyethylene, polypropylene, polyurethane, polyvinyl chloride, rayon and acetate, and combination of some of them.

Figure 3:
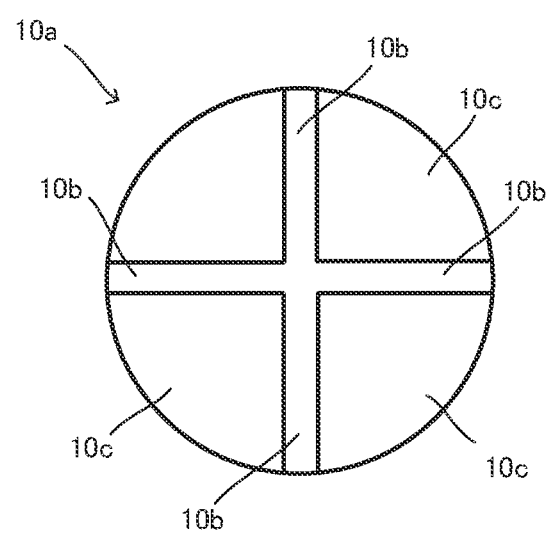

Among them, a filament having a complex cross-sectional shape such that in a cross section thereof, a plurality of materials occupy respective spheres is preferable. FIG. 3 is an explanatory view.

FIG. 3 schematically shows an enlarged lateral cross section of one of the filaments 10a (cross section orthogonal to the longitudinal direction). As can be seen from FIG. 3, this one of the filaments 10a has radial portions 10b extending from the center in four directions that are orthogonal to one another, and portions 10c filling spaces between the adjacent radial portions 10b, on the cross section. In this embodiment, the radial portions 10b are made from nylon, and the filling portions 10c are made from polyester.

In such a filament of such a form, edges and gaps are generated between the portions 10b and the portions 10c, which advantageously works in entangling stains and holding the entangled stains.

Each of the filaments has a thickness that is not particularly limited. The thickness of approximately 1 μm to 50 μm makes it easy to keep the balance between the strength and the cleaning performance as dental floss to fulfil function.

1.2. Tied-Up Part

As can be seen from FIG. 1, the tied-up parts 12 are disposed so as to extend from both respective ends of the floss part 11 in the longitudinal direction. For example, one of the tied-up parts 12 is inserted into a space between teeth so as to be used as a portion to introduce the dental floss 10 into the space between the teeth. Thereafter the dental floss 10 is moved by, for example, pulling the tied-up parts 12 while left remaining between the teeth, to dispose the floss part 11 between the teeth. This makes interdental cleaning using the floss part 11 possible.

The tied-up parts 12 also have filamentous shapes and are constituted of a plurality of filaments 10a that are thin fibers, twisted together. The filaments 10a used for constituting the tied-up parts 12, the number thereof, and the like are the same as those for the floss part 11. Therefore as described later, in the dental floss 10, the floss part 11 and the tied-up parts 12 are constituted of the same continuous raw yarn.

This raw yarn is processed in a longitudinal direction thereof to be classified into the floss part 11 and the tied-up parts 12.

Figure 4:
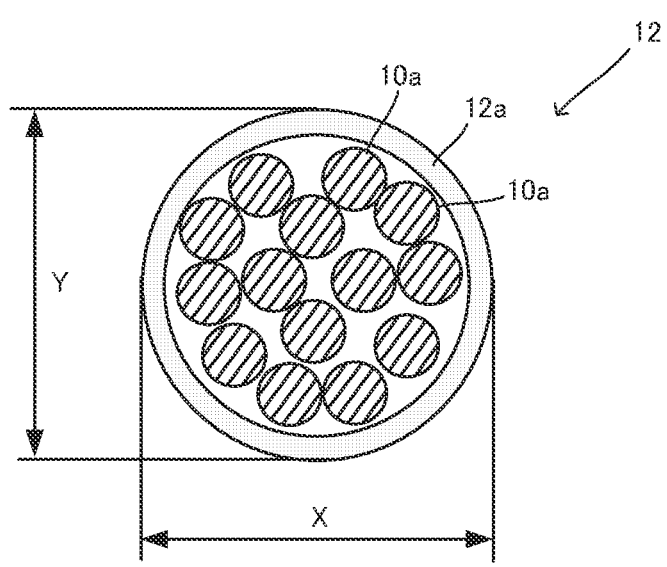
FIG. 4 is an explanatory view of a tied-up part 12.

FIG. 4 schematically shows a cross section along the arrows B-B in FIG. 1 (i.e., a cross section orthogonal to a direction where the tied-up parts 12 and the filaments 10a extend). As can be seen from FIG. 4, in the tied-up parts 12a, a plurality of the filaments 10a are twisted together, and contour parts 12a that are continuous all around the outer circumference of the tied-up parts 12 on the cross section are formed. The filaments 10a are disposed inside the contour parts 12a so as to be denser than in the floss part 11, and the filaments 10a are tied up with the contour parts 12a. Here, the contour parts 12a are formed by welding to join some of the filaments 10a twisted together which are disposed at the outer circumferential portions as described later. In other words, in the present embodiment, the contour parts 12a are derived from the filaments 10a.

Preferably, the contour parts 12a cover the outer circumference of the tied-up parts 12 without any gap. The contour parts 12a do not always have to take a form without any gap at all, and gaps in some degree are allowed.

Each of the tied-up parts 12 has a length $L_S$ that is not particularly limited. The length $L_S$ of approximately 50 mm to 100 mm leads to good handleability in view of introducing or grasping the dental floss.

The filaments 10a constituting the tied-up parts 12 may be considered the same as the floss part 11 because being constituted of the same raw yarn as the floss part 11 as described above. It is noted that the form of the filaments 10a may be changed by processing and thus the individual filaments 10a in the tied-up parts 12 do not have a fixed form.

Each of the tied-up parts 12 preferably has a cross-sectional shape of small oblateness which is most preferably near a circle. This can prevent rigidity from lowering. Specifically, in a cross section thereof, X/Y which is the ratio of the largest width X (e.g., X in FIG. 4) and the smallest width Y (e.g., Y in FIG. 4) is preferably 0.7 to 1.3.

The sizes of X and Y (diameter if the cross section is a circular shape) are preferably 0.3 mm to 0.7 mm. This makes it easy to introduce the dental floss into a space between teeth while rigidity is kept.

1.3. Effects of Dental Floss Etc.

The dental floss 10 as described above can have high rigidity particularly at the tied-up parts 12, and can suppress lowering of the rigidity due to the influence of saliva in an oral cavity. This is considered to be because the contour parts 12a of the tied-up parts 12 improve the strength, and suppress saliva spreading among the inside of the tied-up parts 12. High rigidity can be maintained at the tied-up parts 12, which leads to the dental floss 10 of easy handleability. For example, the dental floss is easily inserted (introduced) into a space between teeth because buckling is difficult to occur whet the dental floss is inserted, or the dental floss is easily held by fingers to handle.

The surfaces of she contour parts 12a are smoother than a surface formed by the filaments 10a tied up without the contour part 12a formed, which can, reduce friction when the dental floss is inserted into a space between teeth. Also in such a view, the dental floss is easily inserted, and tactile sensation thereof in fingers is smooth and is preferable.

The inventors of the present invention compared the rigidity of the tied-up parts 12 of the dental floss 10 according to the present disclosure with conventional products, which was specifically as follows.

Figure 5:
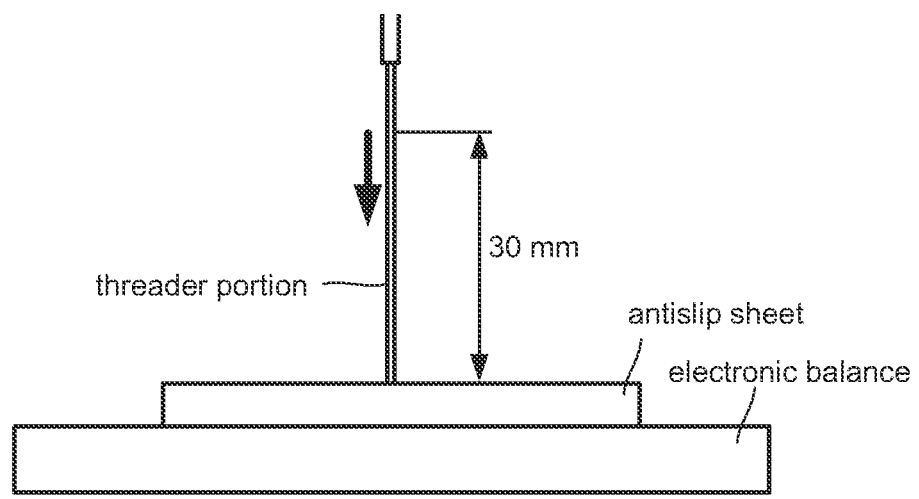
FIG. 5 is an explanatory view for a method of evaluating the rigidity of the tied-up part 12.

As shown in FIG. 5, a point 30 mm from an end of one of the tied-up parts 12 of the dental floss 10 was held by fingers so as to be pinched, and then a face of the end of the tied-up part 12 was pressed against an electronic balance across an antislip sheet. Then, the indication (g) of the electronic balance just before buckling occurred was read. In contrast, as for dental floss of conventional products (commercial products) having tied-up parts, the tied-up parts were tested in the same manner as the above.

While the result of the dental floss according to the present disclosure was 9.0 g, the results of two commercial products were 1.3 g and 4.2 g, respectively. Cross-sectional shapes of the tied-up parts of the commercial products were checked, and as a result, any portion corresponding to the contour part according to the present disclosure was not formed.

2. Continuous Dental Floss and Roll

Figure 6:
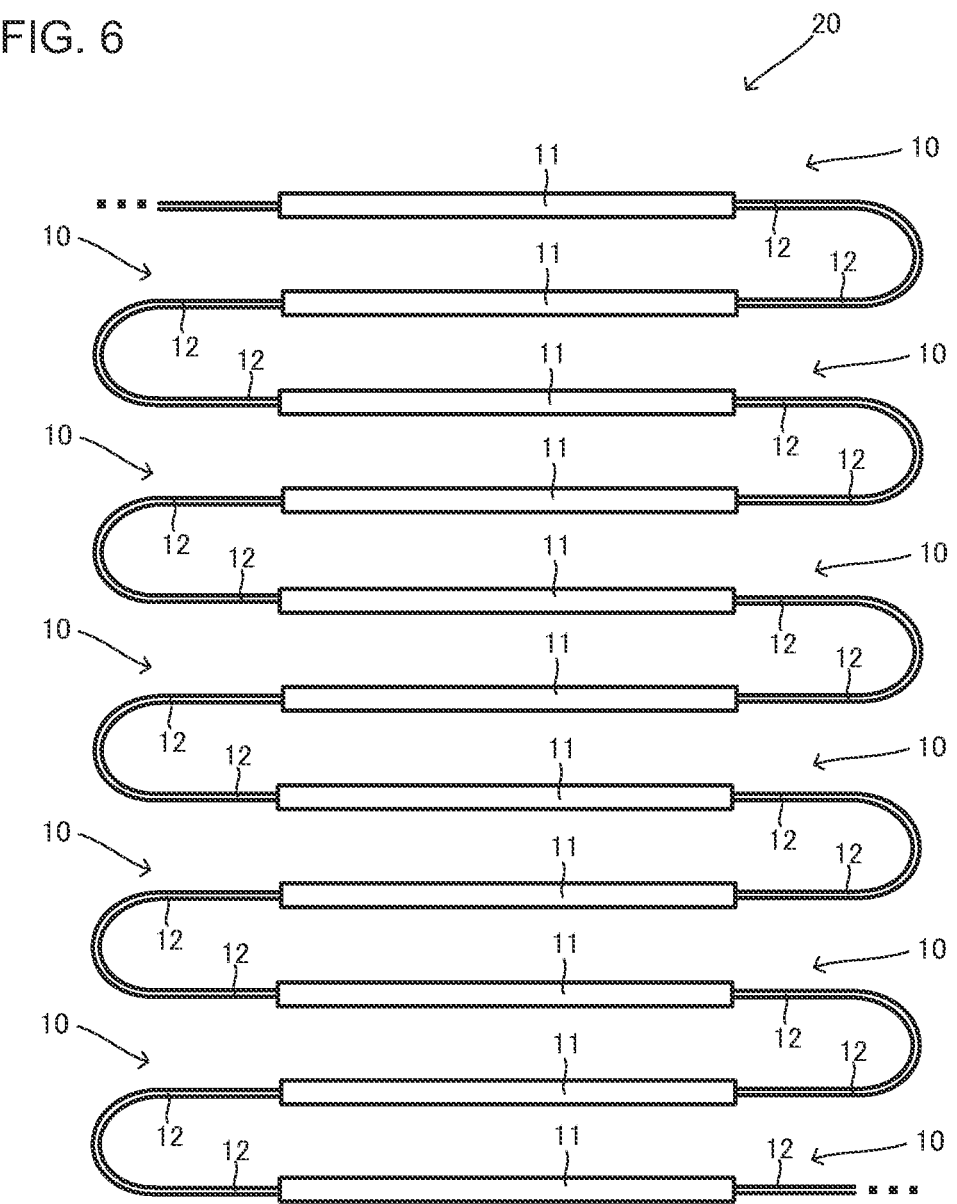
FIG. 6 is an external view of continuous dental floss 20.

The dental floss 10 described so far is a piece of dental floss for one usage. Dental floss is often offered as continuous dental floss that is formed of one continuous body of plural pieces of dental floss for plural usages. Such continuous dental floss is manufactured as a roll wound around a bobbin. The continuous dental floss may be thereafter further divided and held by floss holders each having a size of one hand, to be sold. FIG. 6 shows continuous dental floss 20, and FIG. 7 explanatorily shows a roll 21.

As shown in FIG. 6, a plurality of pieces of the dental floss 10 are made to be one continuous body in the length direction, to be the continuous dental floss 20. At this time, the continuous dental floss 20 takes a form such that the tied-up parts 12 are linked to each other, which leads to a plurality of pieces of the dental floss 10 linked to each other. Accordingly, a user can get the dental floss 10 for one usage by cutting the tied-up parts 12.

Figure 7:
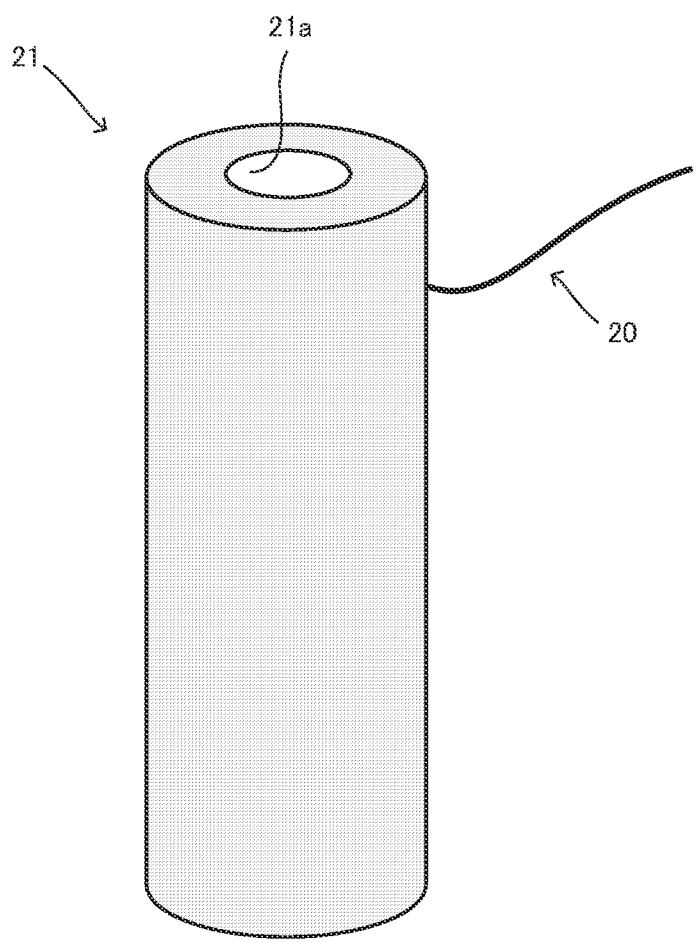
FIG. 7 is an explanatory view of a roll 21.

As shown in FIG. 7, the continuous dental floss 20 is wound around a bobbin 21a, to constitute the roll 21.

3. Method for Manufacturing Continuous Dental Floss

Figure 8:
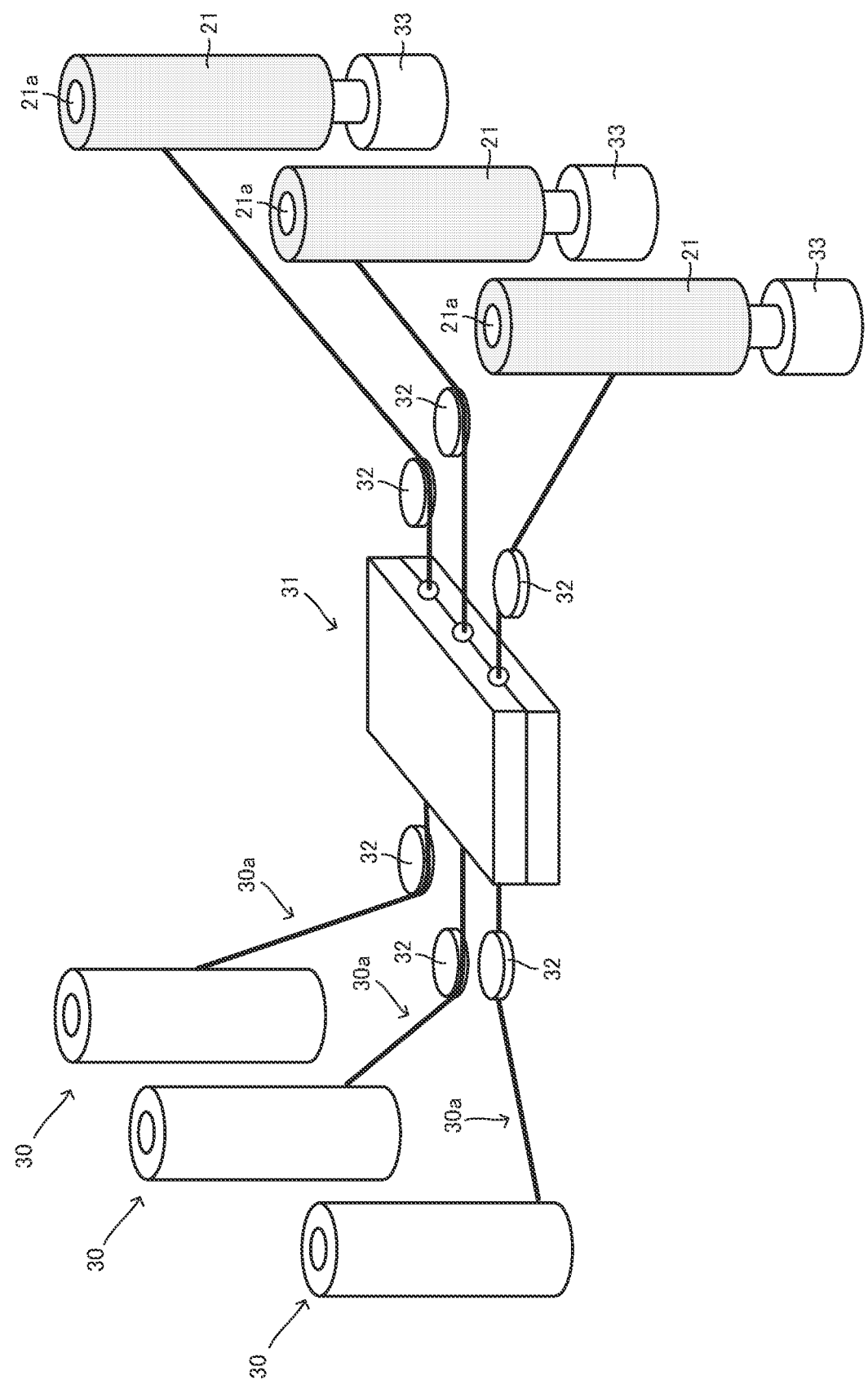
FIG. 8 is an explanatory view of an apparatus for manufacturing the continuous dental floss 20.

A user cuts out and gets the dental floss 10 for one usage from the continuous dental floss 20 as described above. Then, here, the method for manufacturing continuous dental floss and the method for manufacturing a roll will be described. FIG. 8 is an explanatory view.

Raw yarn 30a is drawn out from raw yarn rolls 30 where the raw yarn 30a is wound. The raw yarn 30a is constituted of a plurality of the filaments 10a twisted together. The drawn raw yarn 30a is inserted into a welding device 31. In the welding device 31, the tied-up parts 12 are formed. Here, tension balancers 32 such as a tension roller are disposed before and after the welding device 31, respectively, and adjust the tension of the raw yarn 30a in the welding device 31.

The tied-up parts 12 are formed by the welding device 31, so that the raw yarn 30a becomes the continuous dental floss 20. This continuous dental floss 20 is wound around the bobbins 21a, to be the rolls 21. Drawing out the raw yarn 30a, tension application, and winding the continuous dental floss 20 around the bobbin 21a as described above are performed by servomotors 33 that are attached to the bobbins 21a, driving to rotate the bobbins 21a.

Figure 9:
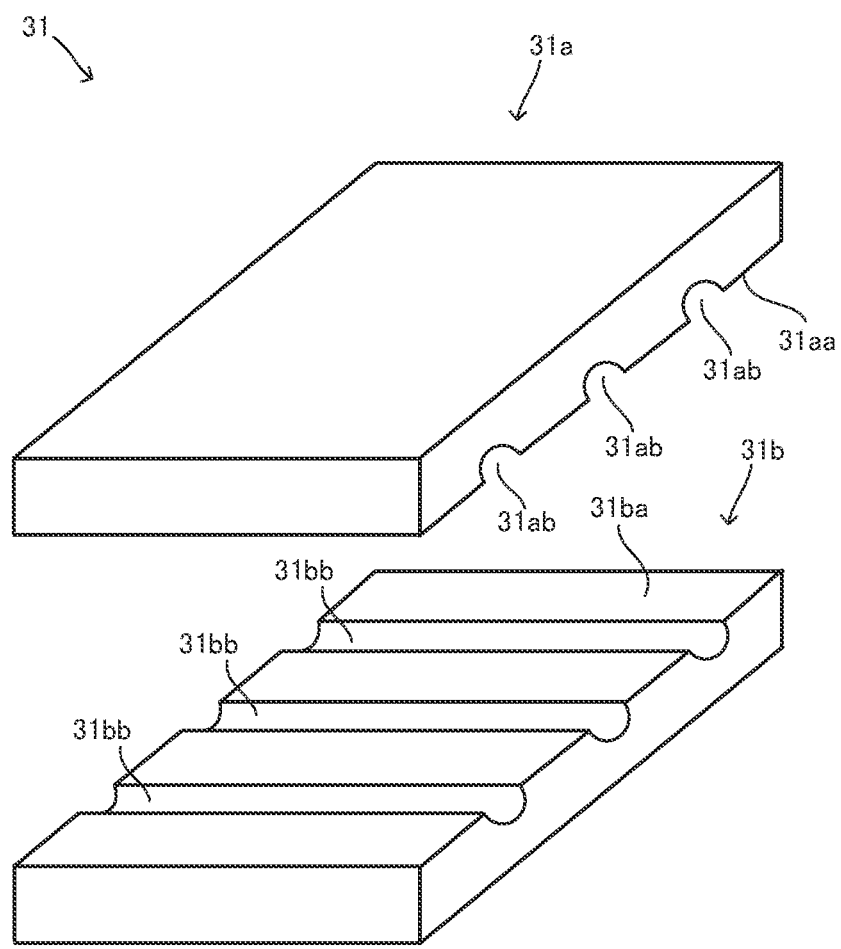
FIG. 9 is an explanatory perspective view of a welding device 31.
Figure 10:
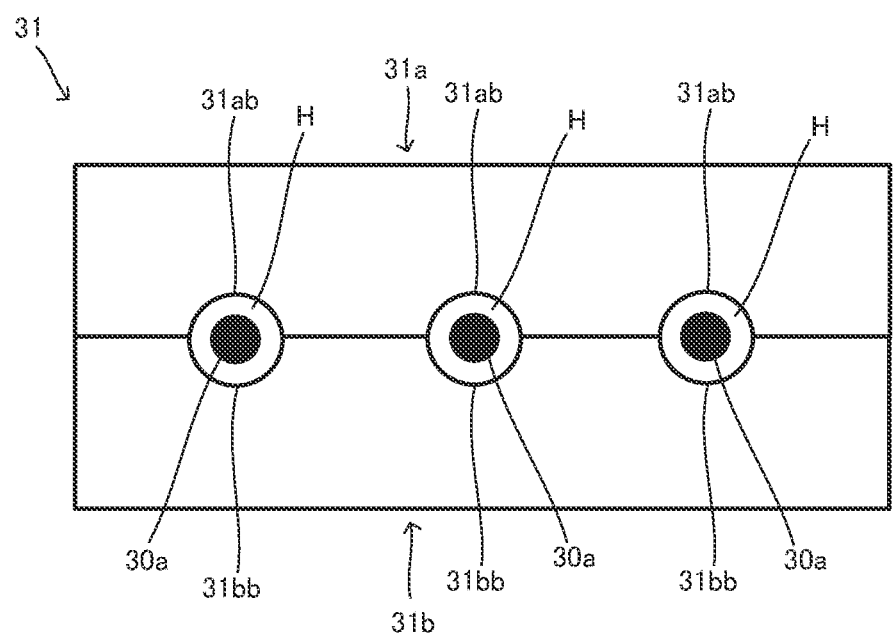
FIG. 10 is an explanatory view of the welding device 31.
Figure 11:
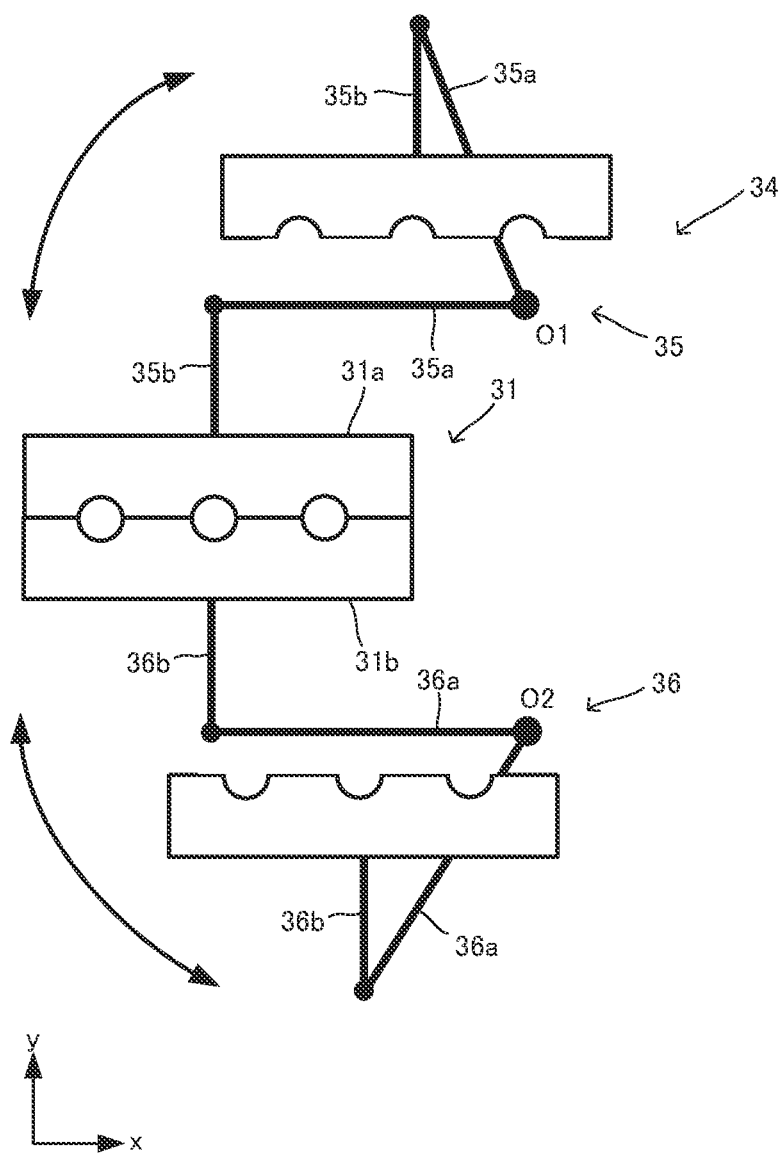
FIG. 11 is an explanatory view of a moving structure of the welding device 31.

Among each of the above steps, formation of the tied-up parts 12 by the welding device 31 will be described in detail. FIGS. 9 to 11 are explanatory views. FIG. 9 is an external perspective view of the welding device 31, FIG. 10 shows a scene where the raw yarn 30a is disposed in the welding device 31, and FIG. 11 is an explanatory view of movement of the welding device 31.

As can be seen from FIG. 9, the welding device 31 has a first heating plate 31a and a second heating plate 31b which are separable two platelike members. The first heating plate 31a and the second heating plate 31b are platelike members made of metal, and are configured to include a heater therein so as to be able to be heated.

The first heating plate 31a and the second heating plate 31b can be superposed so that plate faces 31aa and plate faces 31ba face each other, and can be such that both of the faces are separated from each other.

These facing plate faces 31aa and plate faces 31ba are each provided with a groove 31ab and a groove 31bb, respectively, in the direction in which the raw yarn 30a moves. This, and superposing the first heating plate 31a and the second heating plate 31b result in formation of through holes H between the first heating plate 31a and the second heating plate 31b as shown in FIGS. 8 and 10.

As described above, the first heating plate 31a and the second heating plate 31b can be heated. This heating makes the insides of the through holes H spaces at high temperature.

These through holes H are configured so that the raw yarn 30a, to which tension is applied, can be disposed inside the through holes H but is not pressed by the first beating plate 31a and the second heating plate 31b. Most preferably, the raw yarn 30a can be disposed inside the through holes H so as not to be in contact with the faces of the grooves 31ab and the grooves 31bb. Specifically, each of the through holes H has a diameter approximately 4 times as long as the diameter of each of the tied-up parts to be formed.

Cross sections of the through holes H are not limited to circular holes, but may have other cross-sectional shapes such as a quadrangle.

As shown in FIGS. 8 and 10, a state where the raw yarn 30a is disposed in the through holes H in posture where the first heating plate 31a and the second heating plate 31b are superposed is kept for a predetermined time (a few seconds), which results in formation of the tied-up parts 12. At this time, as described above, tension is applied to the raw yarn 30a so that the raw yarn 30a is thin in a small oblate state, and the raw yarn 30a is heated but not pressed by the first heating plate 31a and the second heating plate 31b, most preferably, but not in contact with the faces of the grooves 31ab and the grooves 31bb. Thus, the outer circumferential portions of the raw yarn 30a are welded to efficiently form the contour parts 12a in a small oblate state on a cross section.

The floss parts 11 and the tied-up parts 12 are disposed in order in the continuous dental floss 20. Therefore, it is necessary to provide portions not to be heated by the welding device 31 (portions remaining as the raw yarn 30a) in order to provide the floss part 11. At this time, the first heating plate 31a and the second heating plate 31b are separated to be away from the raw yarn 30a in order that heating by the welding device 31 must be suspended. FIG. 11 is an explanatory view of a structure 34 for the first heating plate 31a and the second heating plate 31b to be away.

The structure 34 has a first link mechanism 35 and a second link mechanism 36. The first link mechanism 35 is a link mechanism for moving the first heating plate 31a, and the second link mechanism 36 is a link mechanism for moving the second heating plate 31b.

The first link mechanism 35 is configured to have a first link 35a and a second link 35b. One end of the first link 35a is connected to a rotation shaft O1, and the other end thereof is rotatably connected to one end of the second link 35b. The other end of the second link 35b is connected to the first heating plate 31a.

The second link mechanism 36 is configured to have a first link 36a and a second link 36b. One end of the first link 36a is connected to a rotation shaft O2, and the other end thereof is rotatably connected to one end of the second link 36b. The other end of the second link 36b is connected to the second heating plate 31b.

According to the structure 34, when the first link 35a and the second link 35b rotate around the rotation shafts O1 and O2, respectively, the first heating plate 31a and the second heating plate 31b move in an arc orbit so as to be away from each other while maintaining posture thereof. This leads to separation of the first heating plate 31a and the second heating plate 31b from each other, so that the first heating plate 31a and the second heating plate 31b are away from the raw yarn 30a.

This structure 34 can move the first heating plate 31a and the second heating plate 31b in both the x and y directions orthogonal to each other, which makes it possible to efficiently move the first heating plate 31a and the second heating plate 31b, to neutralize the influence of heat for the raw yarn 30a.

REFERENCE SIGNS LIST 10 dental floss
10a filament
11 floss part
12 tied-up part
12a contour part
20 continuous dental floss
21 roll
30 raw yarn roll
30a raw yarn
31 welding device

What is claimed is:

1. Dental floss comprising:
a floss part that is formed by twisting a plurality of filaments together but not tying up the filaments; and
a plurality of tied-up parts provided continuously with the floss part, and are formed by tying up the plurality of the filaments,
wherein each of the plurality of tied-up parts are formed in such a manner that the plurality of filaments are covered with a contour part in a cross section of the plurality of filaments,
wherein the floss part and the plurality of tied-up parts are constituted of a same continuous raw yarn,
wherein the plurality of the filaments are twisted together inside each of the plurality of tied-up parts,
wherein each contour part is continuous around an outer circumference of a cross section of each of the plurality of tied-up parts,
wherein the plurality of filaments disposed inside the contour parts are more dense than the plurality of filaments in the floss part, and
wherein the plurality of filaments are tied up by the contour part of each of the plurality of tied-up parts.

2. The dental floss according to claim 1, wherein the plurality of floss parts and tied-up parts are alternately formed.

3. The dental floss according to claim 1, wherein the number of the plurality of filaments is greater than or equal to 1,000 and less than or equal to 3,000.

4. The dental floss according to claim 1, wherein each of the plurality of filaments comprises a plurality of radial portions extending from a center of a filament in four direction, each of the radial portions being orthogonal to each other,
wherein each of the plurality of filaments comprises a plurality of portions between the plurality of radial portions, and
wherein the plurality of radial portions are made of nylon and the plurality of portions between the plurality of radial portions are made of polyester.

5. The dental floss according to claim 1, wherein each of the plurality of filaments has a thickness greater than or equal to 1 μm and less than or equal to 50 μm.

6. The dental floss according to claim 1, wherein each of the plurality of tied-up parts has a length greater than or equal to 50 mm and less than or equal to 100 mm.

7. The dental floss according to claim 1, wherein each of the plurality of tied-up parts has a cross section made of a largest width and a smallest width, and
wherein a ratio of the largest width to the smallest width is greater than or equal to 0.7 and less than or equal to 1.3.

8. The dental floss according to claim 1, wherein each of the plurality of tied-up parts has a circular shape having a diameter greater than or equal to 0.3 mm and less than or equal to 0.7 mm.

* * * * *